Aug. 19, 1969  R. O. WILSON  3,462,041

HIGH PRESSURE SEALING STRUCTURE

Filed Sept. 13, 1968

INVENTOR.
ROBERT O. WILSON
BY
Raymond L. Owens
ATTORNEY

United States Patent Office 3,462,041
Patented Aug. 19, 1969

3,462,041
HIGH PRESSURE SEALING STRUCTURE
Robert O. Wilson, Monroe County, N.Y., assignor to General Dynamics Corporation, a corporation of Delaware
Filed Sept. 13, 1968, Ser. No. 759,738
Int. Cl. B65d 53/00
U.S. Cl. 220—46     4 Claims

ABSTRACT OF THE DISCLOSURE

A lightweight sealing structure is described which defines a variable pressure cavity such as that used in hydroacoustic oscillators. The structure includes an end cap bolted to a housing, with the housing defining an interior wall. The cap includes a depending skirt to a line-to-line pressure engagement with the interior wall and includes an O-ring at its bottom end which is urged into constant engagement with the interior wall despite and during pressure fluctuations within the cavity.

---

The present invention relates to a high pressure sealing structure.

Within such structures where there is considerable pressure fluctuation, high stress levels may be induced into the securing means, such as bolt members and their receiving threads, which can cause their failure. Moreover such variable pressure creates serious problems of sealing.

In view of the foregoing, it is an object of the present invention to provide a structure which distributes stress concentration and which provides an effective sealing means.

The present invention is especially suitable for providing a high pressure sealing structure which may be embodied in the hydroacoustic oscillator suitable for impact tools, as are exemplified by those shown in U.S. Patent No. 3,382,932.

Figure 1:
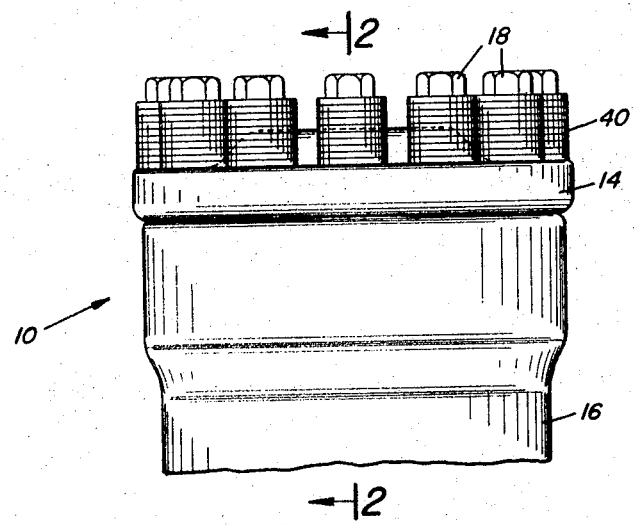
Figure 2:
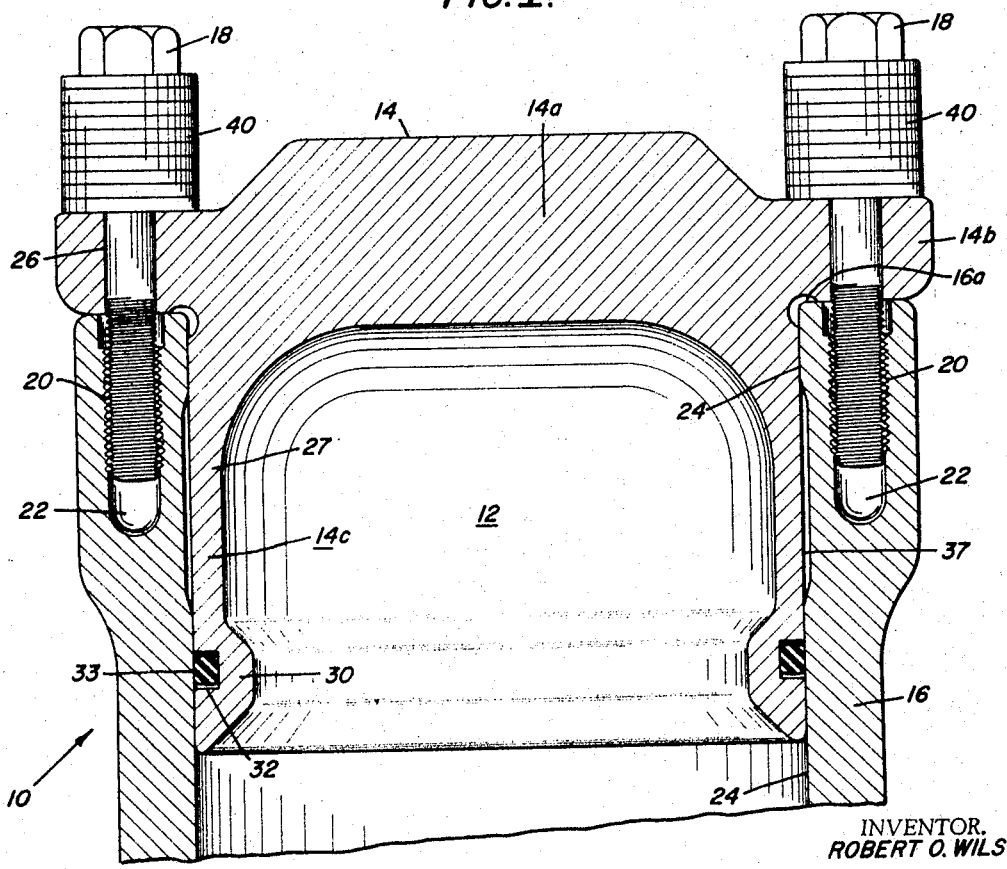

The invention itself, both as to its organization and method of operation, as well as additional objects and advantages thereof will become more readily apparent from a reading of the following description in connection with the accompanying drawing in which:

FIG. 1 is a side sectional view of an exemplary high pressure sealing structure in accordance with the invention; and FIG. 2 is a cross-sectional view taken along the lines 2—2 of FIG. 1.

As shown in FIGS. 1 and 2, a structure 10 defines an interior cylindrical cavity 12 and comprises an end cap member 14, a housing 16 and a plurality of bolt assemblies 18 securing the end cap to the housing.

The housing 16 is provided with a top flat surface 16a through which is drilled helical load distributing threaded holes 20 for receiving the bolt 18. The bottom end 22 of each of the holes 20 is not threaded but is rounded so as to privide for stress relief. In addition, the housing 16 provides an extended interior wall surface 24.

The end cap 14 includes three portions: a head portion 14a; an end portion 14b having a flat surface conforming to the top surface 16a if the housing 16 and through which is bored holes 26 which are aligned with the holes 20 of the housing 16; and a depending skirt portion 14c formed thin enough so as to be flexual. The free end 30 of the skirt portion 14c has a somewhat larger outside diameter than the inside diameter of the housing 16. Thus, when the end cap is in position, it is urged by the spring action arising out of its flexual construction into line-to-line pressure contact with the interior wall 24. The skirt extends from the head 14a into a relatively thin central section 27 which merges into the wider bulb shaped free end 30. The line of contact is therefore a circular line defined by the bottom outside surface of the free end 30.

The free end 30 is formed with a groove 32 which receives an O-ring 33. It should be noted that the skirt 14c extends some distance below the bottom 22 of the hole 20, which arrangement relieves stress concentration from the hole. The spring type action of the depending skirt 14c is such that despite pressure fluctuation, it urges the O-ring into constant engagement with the interior wall 24 thereby preserving a good seal. Moreover, the skirt portion 14c is in line-to-line engagement with the interior wall 24, which arrangement provides for good stress distribution throughout the end cap and the wall.

A small groove 37 has been cut into the interior wall 24 adjacent the thin central portion 27 of the depending skirt 14c to permit expansion of the skirt and thus reduce its failure possibility.

Returning now to a bolt assembly 18, it includes, as shown, the bolt and a stack of spring washers 40 seated on top of the end portion 14b. The bolt is sufficiently tightened so as to be placed under a load despite pressure fluctuations within the cavity 12. By means of this arrangement, stress concentrations in the end cap 14, the housing 16 and the bolt assemblies 18 are reduced, thus permitting the end cap to be fabricated from a lightweight material such as aluminum.

While an embodiment of the invention has been described, variations thereof and modifications therein within the spirit of the invention will undoubtedly suggest themselves to those skilled in the art. Accordingly, the foregoing description should be taken as illustrative and not in any limiting sense.

What is claimed is:

1. A variable pressure confining structure defining a pressure receiving cavity comprising an end cap having a head portion, an end portion, and depending skirt; a housing having a top flat sealing surface corresponding with a surface on said end portion and an interior wall, and securing means for bolting said end portion to said housing, said depending skirt being a flexual member extending along and urged into a line-to-line engagement with said interior wall and terminating in the free end provided with an O-ring structure, said skirt urging said O-ring into constant engagement with said interior wall despite pressure fluctuations within said cavity.

2. The invention as set forth in claim 1 wherein said interior wall is provided with a groove adjacent said central portion of said skirt.

3. The invention as set forth in claim 2 wherein said securing means includes a bolt passing through said end portion and in threaded engagement with threads of a hole formed in said housing and wherein said free end of said skirt is positioned below said hole.

4. The invention as set forth in claim 3 wherein said skirt includes a relatively thin central portion and a wider free end bulb shaped portion and wherein a groove is cut in said interior wall adjacent said central portion.

References Cited

UNITED STATES PATENTS 2,761,279  9/1956  Smith _____ 220—46 XR
3,040,927  6/1962  Chaney _____ 220—46
3,406,864  10/1968 Schmidt _____ 220—46

GEORGE T. HALL, Primary Examiner

U.S. Cl. X.R.

220—3